United States Patent [19]
Franklin et al.

[11] Patent Number: 6,105,069
[45] Date of Patent: Aug. 15, 2000

[54] LICENSING CONTROLLER USING NETWORK DIRECTORY SERVICES

[75] Inventors: Nicholas Huston Franklin, Lehi; Bill Guy Bodine, Orem; Randall R. Cook, Springville; Calvin R. Gaisford, Provo; Matthew G. Brooks, Orem; Carla M. Heesch, Spring Lake; Kelly E. Sonderegger, Santaquin, all of Utah

[73] Assignee: Novell, Inc., Provo, Utah

[21] Appl. No.: 08/970,069

[22] Filed: Nov. 13, 1997

Related U.S. Application Data

[63] Continuation-in-part of application No. 08/786,918, Jan. 22, 1997, Pat. No. 5,893,118.

[51] Int. Cl.[7] .......................... G06F 15/173; G06F 17/00
[52] U.S. Cl. ........................... 709/229; 709/217; 709/223; 709/224; 709/225; 709/226; 395/712
[58] Field of Search .................... 395/200.59, 200.11, 395/610, 200.03, 200.56, 187.01, 712; 707/203, 200, 204, 10

[56] References Cited

U.S. PATENT DOCUMENTS

| | | | |
|---|---|---|---|
| 5,758,069 | 5/1998 | Olsen | 395/187.01 |
| 5,761,499 | 6/1998 | Sonderegger | 395/610 |
| 5,859,978 | 1/1999 | Sonderegger et al. | 395/200.56 |
| 5,893,118 | 4/1999 | Sonderegger | 707/203 |

*Primary Examiner*—Dung C. Dinh
*Assistant Examiner*—Abdullahi Elmi Salad
*Attorney, Agent, or Firm*—Madson & Metcalf

[57] ABSTRACT

A directory services system includes a resource object, such as an application object for accessing a resource associated with the resource object. Attributes of the resource object contain licensing control information. The licensing attributes may be used by executables to control access by a user to properly licensed instances of a resource corresponding to the resource object. Also, a utility may be provided to manage the licensing attributes in the resource object. A licensing function may thus control a resource, via its resource object in the directory services database. Licensing maybe easily implemented by setting a new disabling attribute in the object.

20 Claims, 13 Drawing Sheets

LICENSING CONTROLLER USING NETWORK DIRECTORY SERVICES

RELATED APPLICATIONS

This application is a continuation-in-part of and claims priority to U.S. patent application Ser. No. 08/786,918 filed Jan. 22, 1997, now U.S. Pat. No. 5,893,118, which is incorporated herein by reference.

BACKGROUND

1. The Field of the Invention

This invention relates to networked computer systems and, more particularly, to novel systems and methods for providing run control of applications, using directory services systems, as well as simplified, embedded control of application licensing with minimum effort.

2. The Background Art

The present invention relies on, and improves upon, the management of application programs in a computer network by an application launcher or network application launcher programmed for managing applications in a multi-server network through the use of application objects in a directory services database. This technology is described in U.S. patent application Ser. No. 08/940,789, directed to a directory services-based launcher for load balanced, fan it-tolerant, access to closest resources: Ser. Nos. 08/499,711 and 08/863,860 each directed to a network application launcher for managing applications incorporated herein by reference.

Modern computer networks may contain several servers and numerous clients hosting software administered by a "network administrator". A wide variety of application programs such as word processors, spreadsheets, database managers, program development tools, and the like (collectively, "applications") are typically found on one or more servers in the network. Necessary file access rights and execution environments must be provided by the administrator, and users need notification. Sometimes executable codes and other resources are scattered, and may be replicated, making administration difficult.

A network application launcher (e.g. Novell's NAL) provides computer-implemented methods and apparatus for consistently determining the nature and location of application program executable codes in a network, using directory services objects.

When users travel from one work site to another, they often prefer to maintain the performance and familiarity of the network they ordinarily use. Users who must work away from the normal place of business will typically have certain software applications and other resources on which they depend. An application is typically launched from a server where a user has established rights. Upon traveling to a remote location, a user may desire to access the closest possible server hosting a particular application. Likewise, a user typically desires the least time and interaction possible to launch an application. Moreover, system administrators as well as vendors of software need improved methods for tracking, metering, and licensing software use to reduce costs of over-supporting users as well as for verifying compliance with license terms.

What is needed is a convenience for users and administrators for providing quickly, simply, reliably, and easily the desired licensing services and maintenance abilities over a distributed network, even on remote servers, and other nodes. For example, an administrator may need to license a resource broadly or narrowly to a class, type, organization, or individual. A server that could do so automatically, even dynamically without laboriously removing and replacing rights, access, setup data, etc. in a distributed directory services system would provide numerous economies and improved security.

BRIEF SUMMARY AND OBJECTS OF THE INVENTION

In general, any resource may be located and used (consumed) over a network by the appropriate service corresponding to the resource. Thus, herein, applications are used by way of example of a resource and application objects are examples of any suitable resource object. Directory services objects are known in the art.

The present invention's methods and apparatus for centrally managing application programs in a computer network, improve a Network Application Launcher (NAL) by modifying a database schema and executables (utilities) for managing its information. The database schema defines resources that can be represented, so network administrators have an efficient and effective way to make resources available on the network. Controlling organization, linking, rights assignments, and licensing or other access to a resource may be done simply, and transparently to network users, or groups of users, needing particular network resources.

The resources may be represented in a modified directory services database that includes resource (e.g. application) objects representing resources (e.g. application programs), such as printers, peripherals, word processors and spreadsheets, that reside on the network. The modifications to the schema provided by the present invention support the creation, deletion, alteration, management, and consumption of attributes in application objects in the network directory services (DS or NDS) database. In one embodiment, administrative routines for managing application objects are provided through "snap-in" modules that extend familiar administration tools presently used, for example, in Novell NetWare networks' NW Admin.

Each application object may represent one instance of a resource (e.g. an application) and its execution environment, including, for example, the location of at least one executable code, a brief name that identifies the application, an icon, the location of the application's working directory, drive mappings and printer port captures needed, and the command line parameters (if any) that should be passed to the application to begin execution. Alternative embodiments of the invention may include utilities for managing attributes and executables for consuming them. Application objects may contain one or more of file rights attributes, licensing attributes, foldering links, a site list, fault-tolerance list, and load-balancing list for identifying a closest available, equivalent instance of a resource (e.g. application), and a disabling flag for easily removing such availability.

Other functions may also be added. The new, functional attributes may store key information in the central DS database, which is managed through specified administrator tools and user interfaces. Snap-ins are added to these tools to manage the new attributes. Database updates are thus readily performed with the administrator tools. The application launcher is provided with application programming interfaces (APIs) in dynamically linked libraries (DLLS) as executables for consuming the attributes in order to execute properly and transparently (to a user) an available, closest instance of a desired application.

To provide convenience for traveling users, a system administrator may edit certain attributes in an application object. These attributes may be created for distributing and specifying access and logical links between instances of application objects and corresponding applications. Thus, even though different instances or copies of an application may be hosted on different servers, they are logically the same, and may be so identified by proper values of attributes in an application object.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 11, is not intended to limit the scope of the invention, as claimed, but is merely representative of the presently preferred embodiments of the invention.

Figure 1:
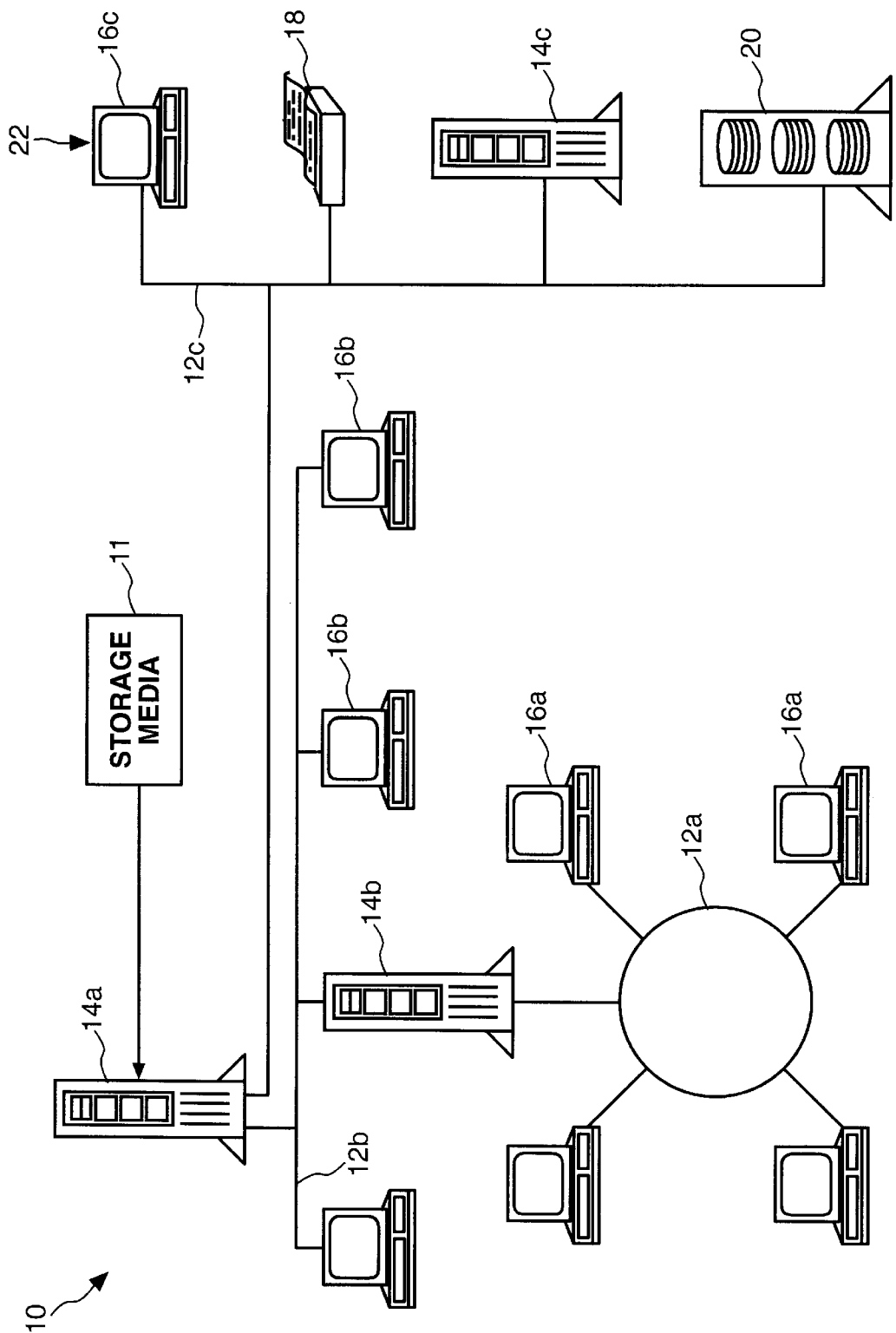
FIG. 1 is a schematic block diagram of a system of networked computers in accordance with the invention.

The presently preferred embodiments of the invention will be best understood by reference to the drawings, wherein like parts are designated by like numerals throughout. Referring now to FIG. 1, a system 10 or network 10 of computers may include a storage medium accessible to one or more networks 12 (e.g. networks 12a, 12b, 12c). A network 12 may be provided service of files, applications, or other functions and data structures by a server 14 (e.g. servers 14a, 14b, 14c). Each network 12 may interconnect an appropriate number of nodes 16 or computers 16 of which a server 14 or router 14 may be warrant. In addition, various printers 18, storage devices 20, remote nodes 16 and the like may serve as resources 22 available to nodes 16 in the network 12.

Figure 2:
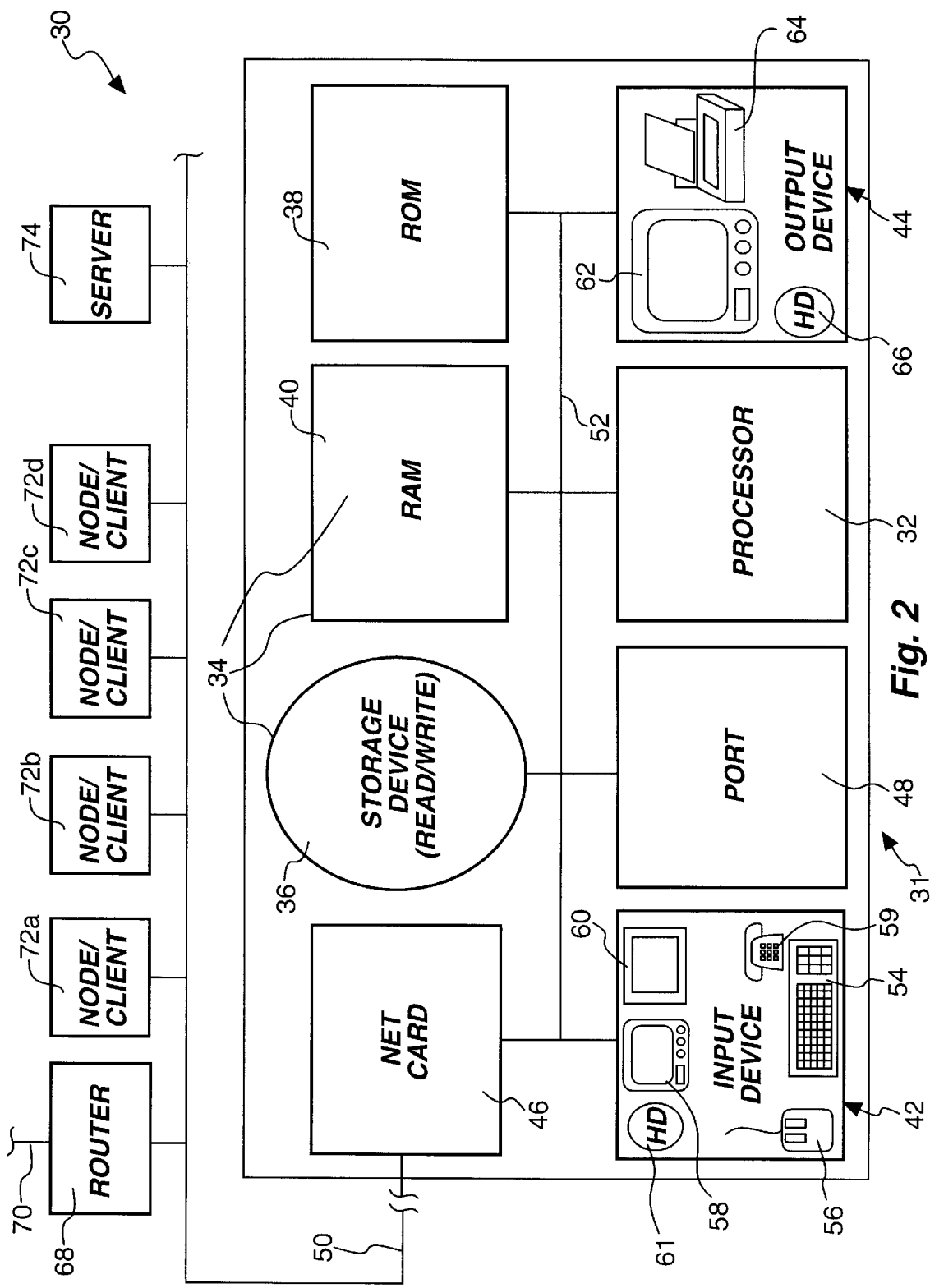
FIG. 2 is a schematic block diagram of an individual node in a network system such as that of FIG. 1.

Referring now to FIG. 2, in general, any network 30 or apparatus 10, such as the network system 10 or apparatus 10 of FIG. 1, may include nodes 31 (e.g. nodes 14, 16, 70, 72, 74). Each node 31 may include a processor 32 and memory devices 34, such as storage devices 36, read only memory (ROM) 38, and random access memory (RAM) 40, sometimes referred to as operational memory. The node 31 may include a variety of input devices 42, and output devices 44 whether dedicated as illustrated in FIG. 2, or available over a network 12 of FIG. 1, as resources 22.

Typically, a node 31 may include a network card 46 for connecting to a network 50 (e.g. network 12) outwardly, and a bus 52 for interconnecting elements internally. Input devices 42 may include a keyboard 54, a mouse 56 or other pointing device such as a stylus or graphics tablet, a touch screen 58, a scanner 60, or even a storage device 61 for providing data to the node 31. Similarly, output devices 44 may include monitor 62, printer 64, storage devices 66, and the like for providing data from the node 31.

A router 68 may interconnect networks 50, 70 where each network 50, 70 may include some simple nodes 72, such as clients 72a–72d, and servers 74. Networks 12, 50, 70 are well understood in the art. Accordingly, the hardware illustrated in by way of an example, and not limitation as to the hardware suite on which the invention may be implemented. More or less equipment may be used in many particular embodiments.

Figure 3:
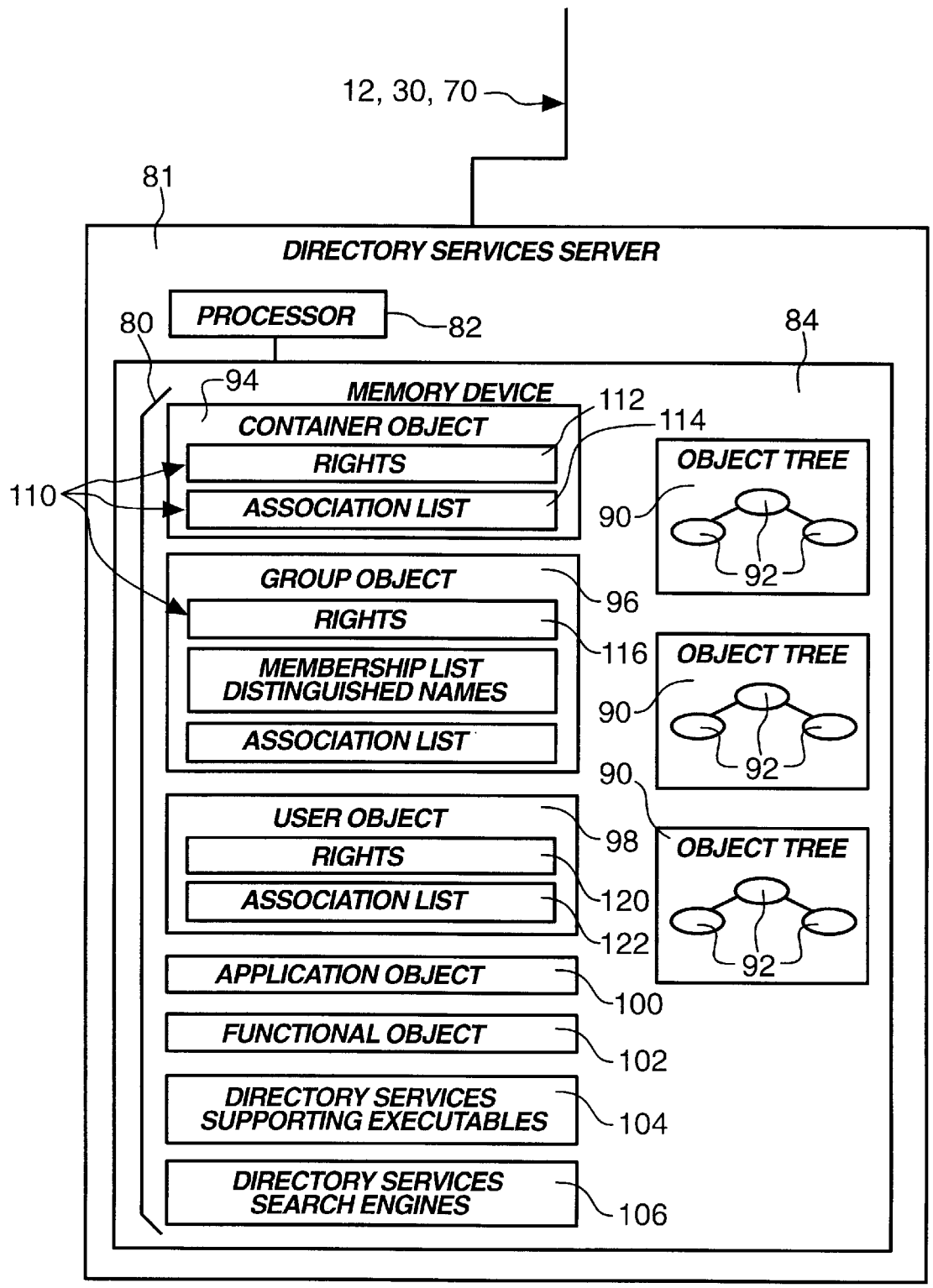
FIG. 3 is schematic block diagram of a directory services system on a server, such as a server of FIG. 1 and FIG. 2.

Referring now to FIG. 3, directory services system 80 may be hosted on a directory services server 81. A directory services system 80 is typically highly distributed among nodes 31 over interconnected networks 12, 30, 50, 70, and thus may be referred to simply as directory services, regardless of which particular data structures and hardware may be implicated or required for a particular task.

Nevertheless, a directory services system 80, 81 may include a processor 82 for executing executables, where an executable may be any executable data structures from a single machine instruction to a sophisticated system of applications. The process 82 may rely on memory device 84 to create, manage, or store object trees 90 of individual objects 92 linked in a hierarchical relationship.

For example, container objects 94 can contain other objects, whereas a group object 96 merely contains information identifying relationships between objects 92, which need not be hierarchical. A user object 98 is one example of an object that may be identified by a group object 96, and contained in a container object 94 (a parent 94 to the leaf 98).

One very useful object 92 is an application object 100, identifying certain important information associated with an actual executable file corresponding to an application. Various application objects 100, 102 may be stored and related in object trees 90 in a directory services system 80. A directory services system 80 includes numerous executables 104 known in the art and well described elsewhere. Likewise, directory services search engines 106, or simply search engines 106, may include sophisticated methodologies for creating and executing queries to locate specific objects 92 in an object tree 90 within a directory services system 80. One should keep in mind that, in general, a directory services system 80 may actually be distributed throughout the memory devices 11, 34, 84 of any appropriate number of networks 12, 30, 50, 70. Typically, an object 92 may be created to include methods 108, attributes, or both, as known in the art. For example, containers 94, groups 96, users 98, and applications 100 (abbreviating the names of these objects to a single word each) may each contain, respectively, certain rights 112, 116, 120 or rights attributes 112, 116, 120, and one or more association lists 114, 118, 122, for identifying other objects 90 to having some relationship thereto.

Figure 4:
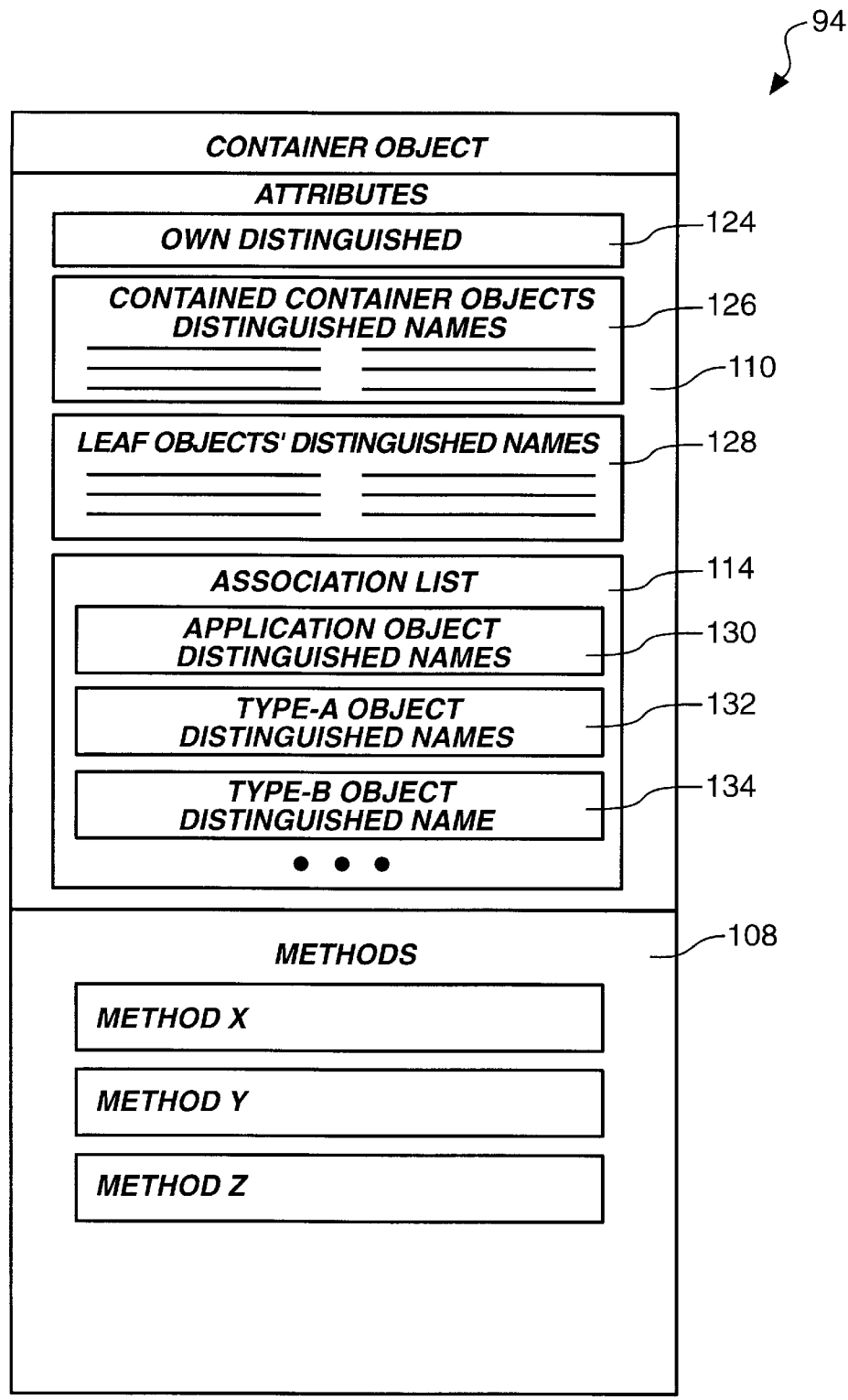
FIG. 4 is a schematic block diagram of a container object in a directory services system of FIG. 3.
Figure 5:
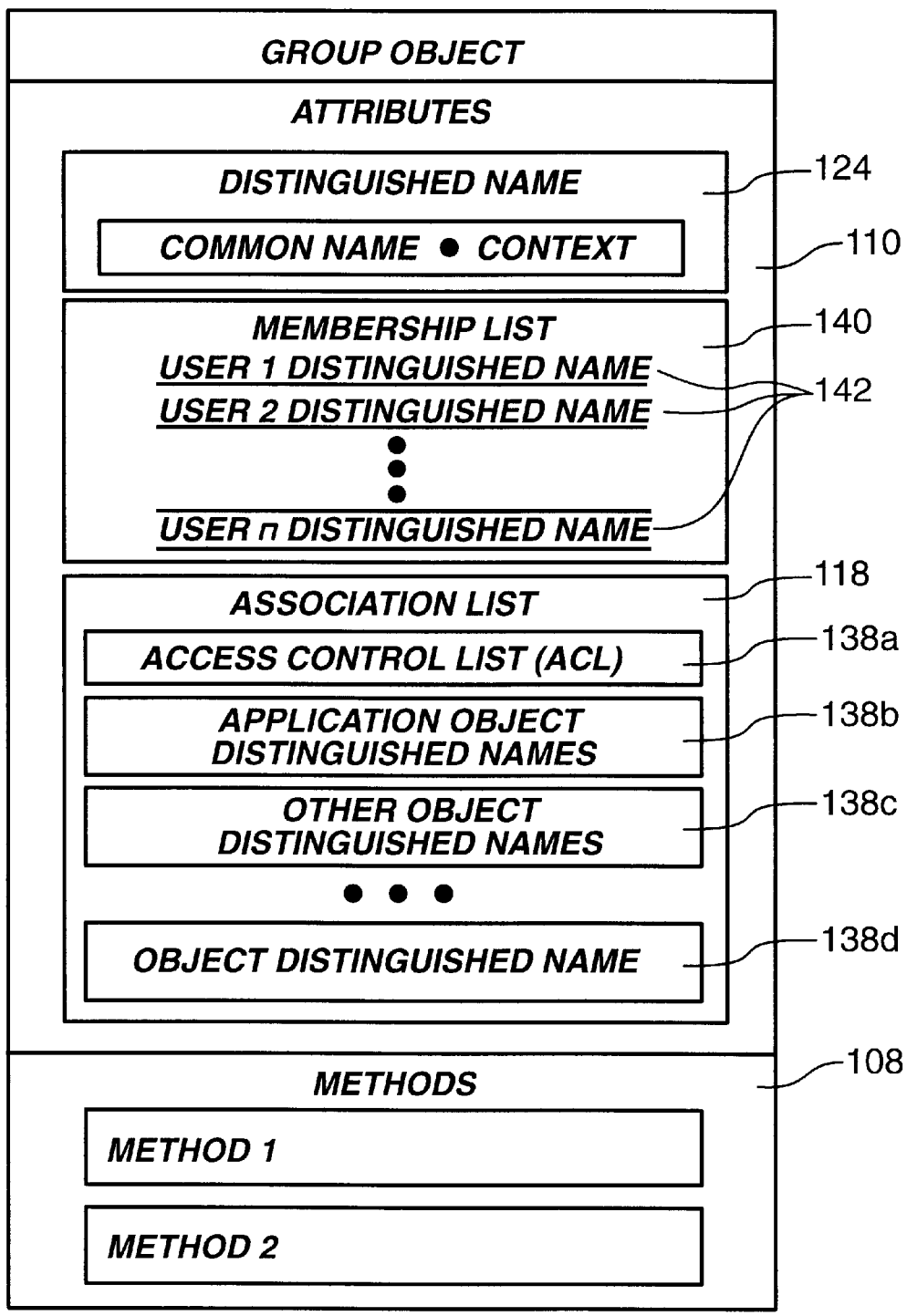
FIG. 5 is a schematic block diagram of a group object in a directory services system of FIG. 3.
Figure 6:
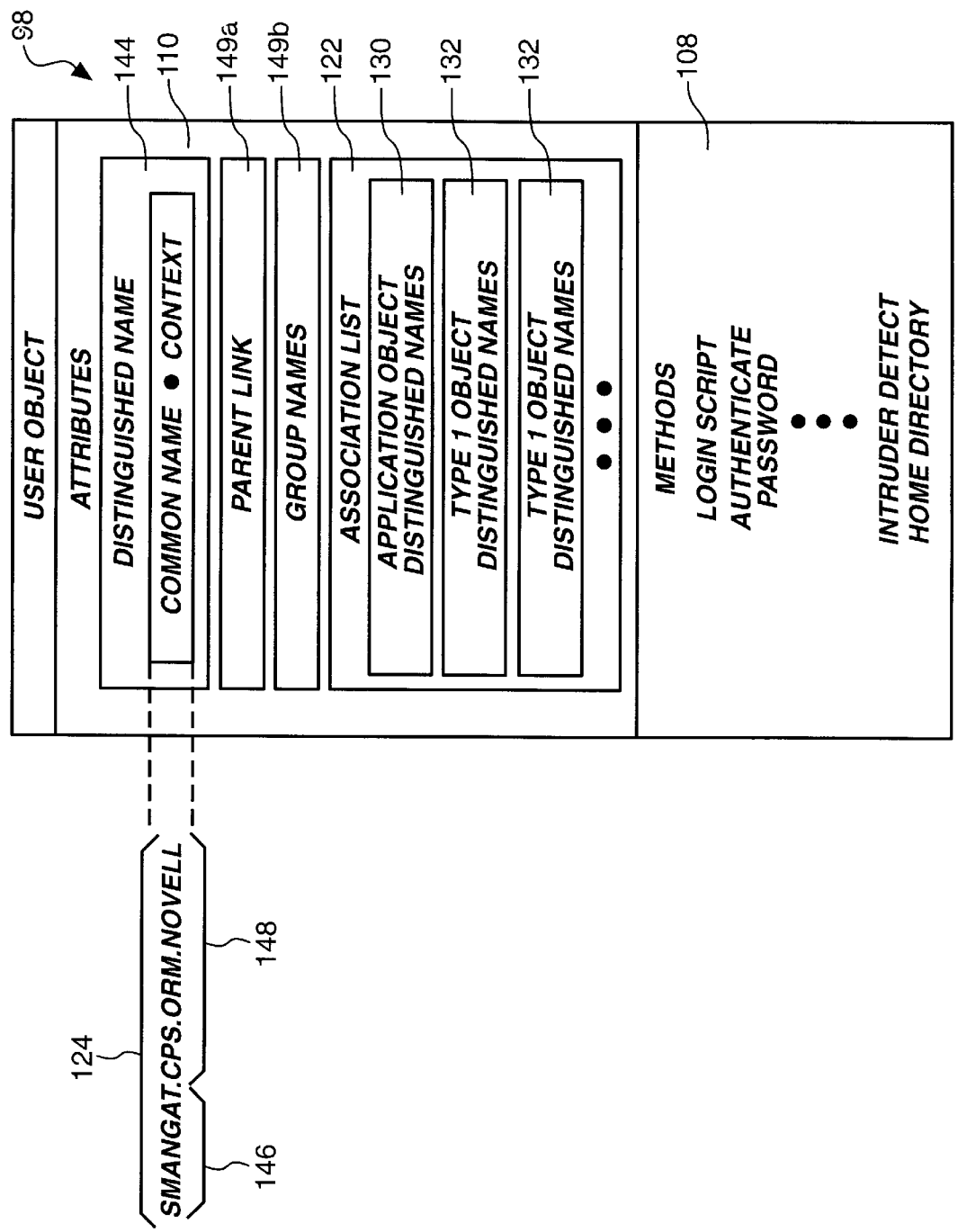
FIG. 6 is a schematic block diagram of a user object in the directory services system of FIG. 3.

Referring now to FIGS. 4–6, in view of FIG. 3, an object 92, such as a container object 94, may include an attribute 110 of its own distinguished name 124. Likewise, for container objects 94, a list 156 of distinguished names contained therein or thereby is included, as well as a list 128 of leaf objects' distinguished names contained therein. The association list 114 may identify certain distinguished names 130, 132, 134 of application objects or other resource objects associated with the object 94, 96, 98 in question.

A group object 96 may include a binding data structure, typically an association list 118, identifying associations, such as, for example, access control lists 138*a*, application object distinguished names 138*b*, and distinguished names 138*c*, 138*d* of other associated resource and other objects. A group object 96 may also have certain unique attributes 110, such as a membership list 140 identifying the distinguished names 142 of all users or user objects 98 having membership in the group 96.

A user object 98 is associated with an individual user. The distinguished name 144 of FIG. 6 is exemplary of all distinguished names 124. Each distinguished name 124 typically includes a common name 146 in association with a context 148. Context 148 may include acronyms, abbreviations, or other identifications of organizations, geography, logical relationships, and enterprises, as illustrated. Context 148 is sometimes thought of as a logical path or may be so configured in a particular directory services system 80.

Figure 7:
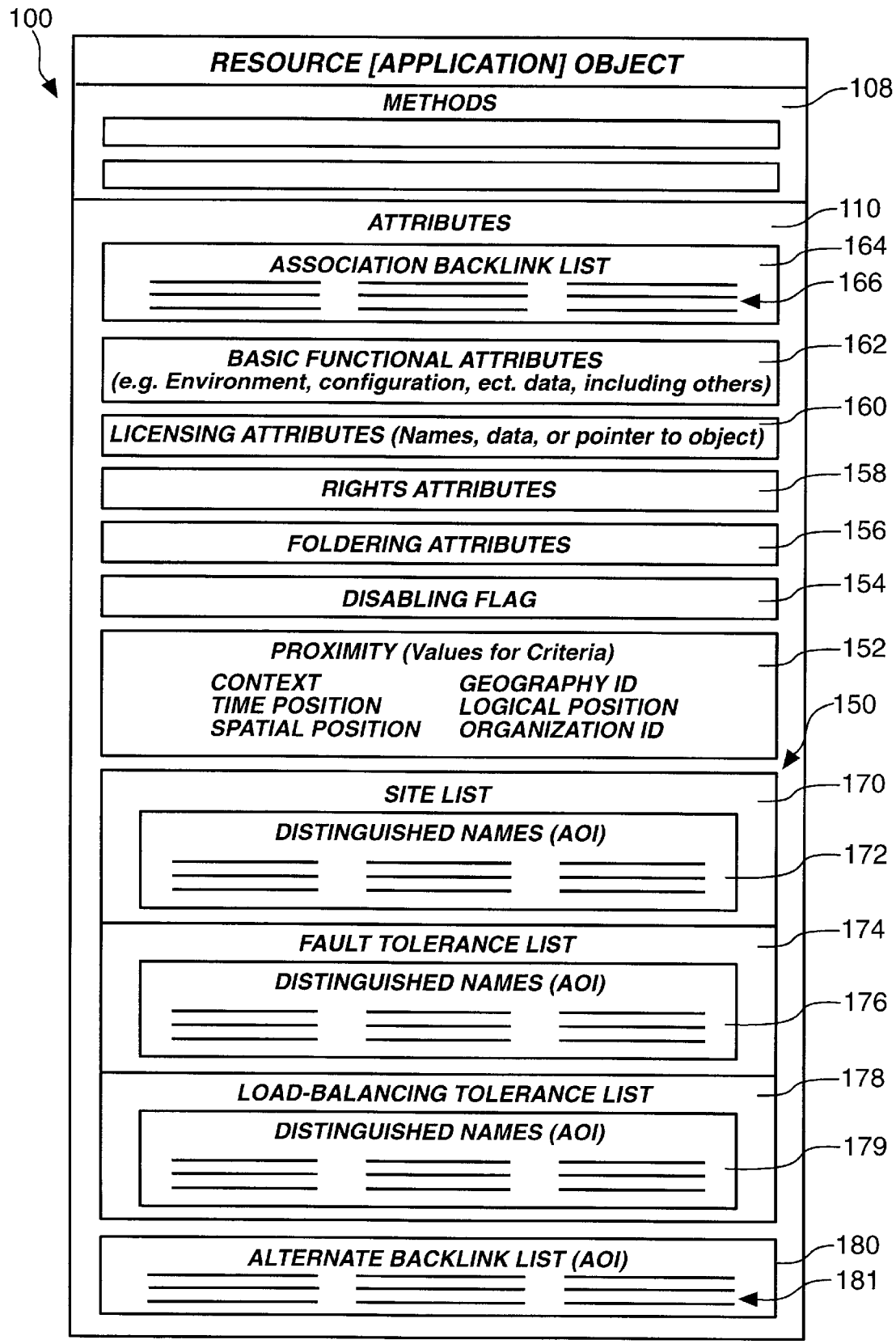
FIG. 7 is a schematic block diagram of an application object in accordance with the invention for inclusion in the directory services system of FIG. 3.

Referring now to FIG. 7, an application object 100, in accordance with the invention, may include methods 108 and attributes 110. In one presently preferred embodiment, reliability attributes 150 (alternatively referred to as redundancy attributes, hierarchy of redundancy, or instance relation attributes) may be added to an application object 100.

A proximity attribute 152 may provide values associated with the application object 100 for determining the proximity of the application object 100 and its associated resources to a particular hardware location or physical user. The proximity attribute 152 may reflect a measurement, context, a time position or time for access, spatial position, organizational identification, logical position, or geographical identifier for identifying a proximity of an application object 100 with respect to a coordinate system locating another object, such as a user object 98, group object 96, or container object 94.

A proximity attribute 152 may reflect any measurement criterion effective for determining relative ease of access by one object 92 to a particular application object 100. A disabling flag 154 may provide an ability to determine whether or not an application object 100 has been removed from access. Configuration of environments, rights, masks, associations, and the like may be relatively time consuming and burdensome to the system.

To manage such allocation of configuration information when an application object 100 is to be removed from service for a short period of time, such as during maintenance, may be a colossal waste of time. Thus, a disabling flag 154 may be set as an attribute to be read by any executable attempting to access the application object 100. A disabling flag 154 allows the application object 100 to exist, fully configured, and yet be inaccessible. Thus, any executable seeking to access an application object 100 may be referred to the redundancy attributes 150 in order to find an equivalent instance to be used in place of the application object 100.

A foldering attribute 156 may be provided to store information indexing the associations corresponding to an application object 100 and other objects 92 in a directory services database 90. Rights attributes 158 may contain any information associated with authorizations appropriate to access of or by an application object 100.

Similarly, licensing attributes 160 may identify authorizations, charges, and other administrative information required for licensing an application associated with an application object 100. As understood in directory services systems, an object 92 (e.g. application object 100) represents logically certain files of data or executables (e.g. an application), and each is often spoken of as the other, though they are not actually the same thing. In general, the attributes 150–160 are new specialized attributes associated with certain features corresponding to the inventions disclosed herein, and may be incorporated into the basic functional attributes 162 associated with application objects 100 in general.

Thus, in certain embodiments, basic functional attributes 162 may include environment information, configuration information, and other data. In other embodiments, the attributes 150–160 may be included in the basic functional attributes 162. Meanwhile, other functional attributes may be added for special functionality.

A key attribute 110 of a resource object 100, such as an application object 100, may be an association backlink list 164 containing distinguished names 166 of objects associated in some appropriate way with the resource object 100. The association backlink list 110 may be used for binding security, and management of access to the resource represented by the resource object 100. The hierarchy 150 or redundancy attributes 150 may include a site list 170 of distinguished names 172, a fault-tolerance list 174 of distinguished names 176, a load-balancing list 178 of distinguished names 179, or all lists 170, 174, 178, where the distinguished names 172, 176, 179 represent alternative instances of application objects or application object instances (AOI). The distinguished names 172, 176, 179 may be relied upon when the application object 100 is unavailable for access.

All those certain preferred embodiments of an apparatus and method in accordance with the invention may use load-balancing, fault-tolerance, and remoteness of a user from a home network, to justify hierarchical reliance on the load-balancing list 178, fault-tolerance list 174, and site list 170, in that order, and the proximity value 152 may also be used for determining, in order and instance of an application object 100 to be accessed, based solely on the proximity attribute 152.

For example, if the disabling flag 154 is set to make the application object 100 inaccessible, for any reason, the hierarchy 150 may be relied upon in conjunction with the proximity attribute 152 in order to find the "closest" available instance of the application object 100 for access.

An alternate backlink list 180 may include distinguished names 181 of objects 92 (e.g. application object instances equivalent application object 100) in which the application object 100 is identified by a respective redundancy attribute 150. Thus, the alternative backlink list 180 provides administrative information for cleaning up associations throughout a dirty services object tree 90.

Figure 8:
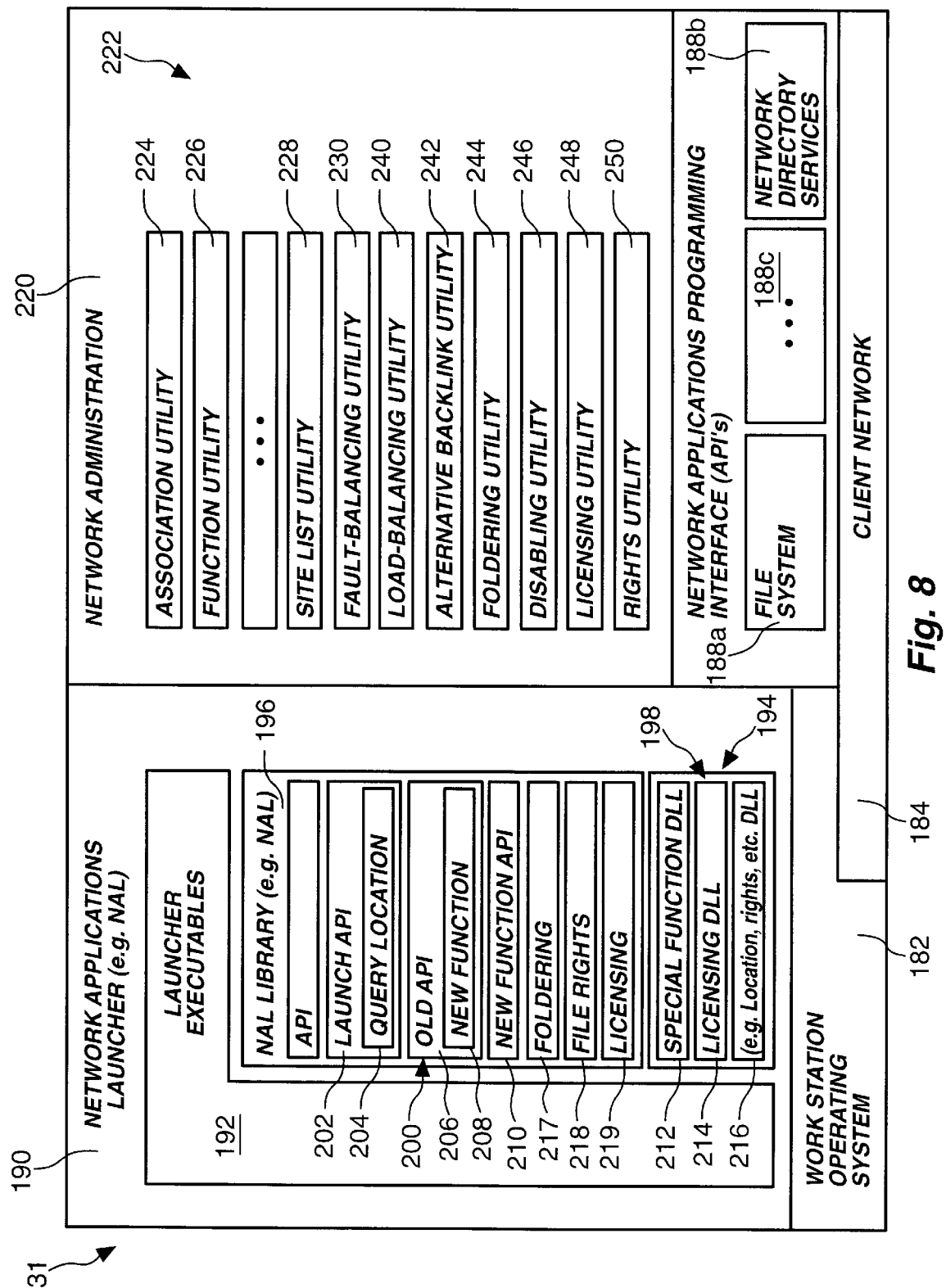
FIG. 8 is a schematic block diagram of a network application launcher system illustrating data structures for administrating and executing functions and data structures in accordance with the invention.

Referring now to FIG. 8, a node 31 may contain executables in a storage device 34 for executing in a processor 32 (see FIG. 2) in accordance with the invention. An operating system 182 (workstation operating system 182) may interface with a client 184, alternatively called a client module or network client 184, connecting to a network 50. Network application programming interfaces (API's) 186 may include biosystem API's 188a, network directory services API's 188b, and other API's 188c interfacing directly with the client 184.

A network application launcher (NAL) 190, interfacing with the operating system 182 may include various launcher executables 192. Executables 192 may include single instructions, applications, libraries, functions, and the like, including specially programmed dynamically linked libraries (DLL) 194. For example, a NAL library 196 includes various API's 200 including a launch API 202, including a query 204 programmed to query an application object 100 for location data, such as proximity attributes 152. As a practical matter, the API's 200 may include adaptations of old, or less-conventional functions such as an old API 206, provided with a new function 208 for implementing the invention.

Alternatively, new functional API's 210 may be programmed for implementing certain embodiments of the invention. In yet another alternative, new DLL's 198 may be added, each DLL 198 being provided specifically for supporting a new special function in accordance with the invention. For example, a special function DLL 212 may be created for selecting a closest application object 100 to a user object 98 in a particular object tree 90. Special function DLL's 212 may be created for providing fault-tolerance executables, load-balancing executables, and remote access executables for using (consuming) the attributes 150 of an application object 100. Thus, a special function DLL 212, or a new functional API 210, or simply a new function 208 in an old API 206 may contain the executables for consuming attributes 110 of an application object 100.

In certain embodiments, a licensing DLL 214, a location DLL 216, for consuming the redundancy attributes 150, or a rights-management DLL for managing access rights, may all be included in a DLL 216 or individual DLL's 198. The functionality of the DLL's 194 may be accomplished in several different ways. For example, in general, a network administration module 220 may contain utilities 222 for managing (creating, modifying, deleting, etc.) attributes 110 in an object 92, such as an application object 100. The DLL's 194 may be configured to consume (use, access, read, etc.) the attributes 110 managed by the utilities 222.

Figure 9:
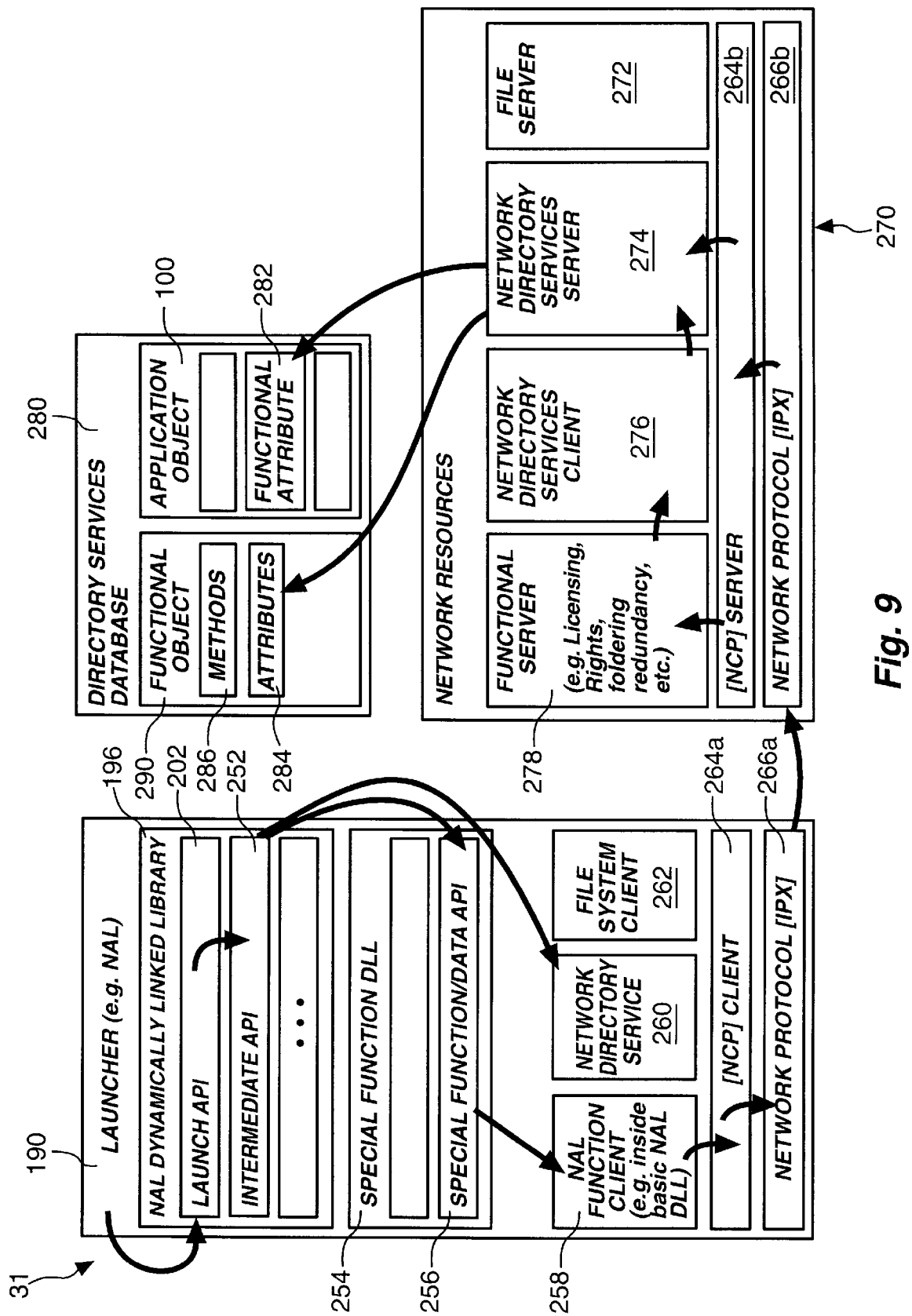
FIG. 9 is a schematic block diagram of data structures and operational access for one embodiment of an architecture for a network application launcher, such as that of FIG. 8.

However, a simple executable such as a new function 208 adapted to implement a feature of the instant invention may completely satisfy any functional need and use of an attribute 110. Alternatively, a new functional API 210 may be programmed to access or use an attribute 110. Alternatively, a new function 208, or new API 210, may provide indirection by calling another DLL 198 (e.g. 212, 214, 216) or APIs 200 to perform or supervise a desired function. FIG. 9 further elaborates on methods and data structures for these different approaches.

The utilities 222 are also referred to as snap-ins 222, and are each associated with some specialized functional ability. Thus, in general, an association utility may manage an association list 164 in application object 100. Other functional utilities 226 may be created for any particular need. Specific needs identified for embodiments for the instant invention may include a site list utility 228 for managing distinguished names 172 in the site list 170, a fault-tolerance utility 230 for managing the distinguished names 176 in the fault-tolerance list 174, a load-balancing utility 232 for managing the distinguished names 179 in the load-balancing list 178, an alternate backlink 234 for managing the contents of the alternate backlink list 180, a foldering utility 236 for managing the foldering attributes 156, a disabling flag utility 238 for managing the disabling flag 154, a licensing utility 240 for managing the licensing attributes 160, and a rights utility 242 for managing a rights attributes 158.

In general, an object 92 (e.g. application object 100) has attributes 110 and may have methods 108 for using certain of the attributes 110. A network administration module 220 manages the attributes 110 through the snap-ins 222 (utilities) in order that those attributes 110 will be available for use by API's 200 in the network application launcher 190.

Utilities 222 may be highly distinctive, or integrate many functionalities into a single utility. The architecture choice is largely available to a developer in order to provide the most robust and adaptable system. For example, in one presently preferred embodiment, the network application launcher 190 includes a query location executable 204 in the launch API 202 of the NAL library 196. The location of an application object 100 is identified thereby. Location may actually be defined and queried by any suitable rule.

In certain embodiments, location may be an identification by server, by actual spatial global positioning systems, by network directory services hierarchical position within a tree 90, by geographical location name, by context, by path, by any of the values of the proximity attribute 152, by routing speed between locations, by global addressing scheme, DHCP protocol, or the like. The query 204 may eventually access the redundancy attributes 150 and the proximity attributes 152 to resolve the query 204, select an application object instance, and complete the launch thereof.

Referring to FIG. 9, and certain features of FIGS. 2–8, a node 31 may host a launcher 190 relying on a dynamically linked library 196 of API's 200, such as a launch API 202 and intermediate API's 252 access thereby. In addition, special function DLL 254 including special function 256 operating as NAL function clients 258 with the network operating system clients 264 and network protocol 266 may access network resources 270. A file server 272, network directory services server 274, and specialized, functional servers 278 may operate as resources 270. The network resources 270, may access a directory services database 280 (via clients 276 to server 274), such as the object trees 90 (see FIG. 3) to access application objects 100, in order to provide the functional attributes 282 needed by the API's 256, 252, 202 to operate. In certain embodiments necessary attributes 284 may be provided along with methods 286, or alone, in specialized, functional objects 290 adapted to specific functions or purposes.

Referring to FIG. 9, a node 31 hosting a launcher 190 (e.g. NAL 190) relying on a NAL library 196 including a launch API 202 may call, or include, or otherwise engage, an intermediate API 252. In one embodiment, the calling API 252 may call, relying on indirection, a special function dynamically linked library 254 to access a special function API 256 adapted to the requested function, such as one of those associated with the attributes 110 of FIG. 7, DLL 194 of FIG. 8, and snap-ins 222 of FIG. 8.

The special function API 256 may also be thought of as a NAL client 258 or a NAL function client 258 for accomplishing a desired function. The client 258 may then access through the network client 264 a (e.g. for example, a netware core protocol) through a network protocol 266a client module (e.g. IP, IPX, etc.) to the server portion of the network protocol 266b and network server module 264b to access a functional server 278.

A functional server 278 may be dedicated to a particular function, such as the licensing, rights management, redundancy provision, or the like, in accordance with the attributes 110 and API's 200 of FIGS. 7–8. Thus, the server 278 may access a network directory services client module 276 contacting the directory services server 274 to provide access to a functional object 290 adapted to the desired function, and containing the attributes 84, methods 286, or both for accomplishing the function.

Alternatively, the launcher 190 may call the launch API 202 which, after engaging the intermediate API 252, may engage a network directory services client module 260. The client 260 may then access through the client 264a, protocol 266a, protocol 266b, and server module (interface 264b), the network directory services server 274. In this embodiment, the network directory services server 274, (server 274) may then access directly a functional attribute 282, such as any of the attributes 110 of the application object 100. Thus, in this embodiment, a calling API 252 may actually consume the attribute 110 provided in accordance with the invention implementing benefits of any particular function of the invention.

In one embodiment, a single attribute 110 may be used, in alternative embodiments, any number of the attributes 110 may be used in an application object 100, or a specialized functional object 290 program for a specific purpose. For example, a licensing object 290 may be provided, or a rights management object 290, or the like.

Thus, when a launcher 190 accesses a launch API 202, the launch API 202 may perform alone or may rely on an intermediate API 252 directly or using further in direction. The intermediate API 252 may be configured for to executing specialized function directly. Alternatively, the intermediate API 252 may engage the client 258 to obtain access to a specialized, functional object 290 for executing the desired functional features.

In yet another embodiment, the intermediate API may access a network directory services client 260 in order to obtain functional attributes 282 directly from a directory services database 280 in an application object 100. Thus, high levels of sophistication may be provided in the methods 286 and attributes 284, or function attributes 282 may be accessed directly for use in API's 200, such as the API's 252, 256 programmed to provide any required skills.

In a simple, but less flexible, approach, an intermediate API 252 may have a desired executable embedded therein, or in the launch API 202 itself may have any functional executables embedded therein. Thus, programming may be simplified but rigid, or flexible, but more complex, by any of the above mechanisms. The functional features of providing associations, the remote accessed at distance sites from a home network, providing fault-tolerance access to alternative objects 92, 100, load-balancing by accessing alternative servers 14, backlinking, foldering of application objects 100 or other objects 92 to be displayed, viewed, and managed in some logical hierarchy, disabling an object 92, particularly an application object 100, without having to remove and restore configuration, licensing, and rights management, may all be provided by individual combinations of attributes 110 managed by snap-ins 222 and consumed by API's 200 in the network application launcher 190.

Figure 10:
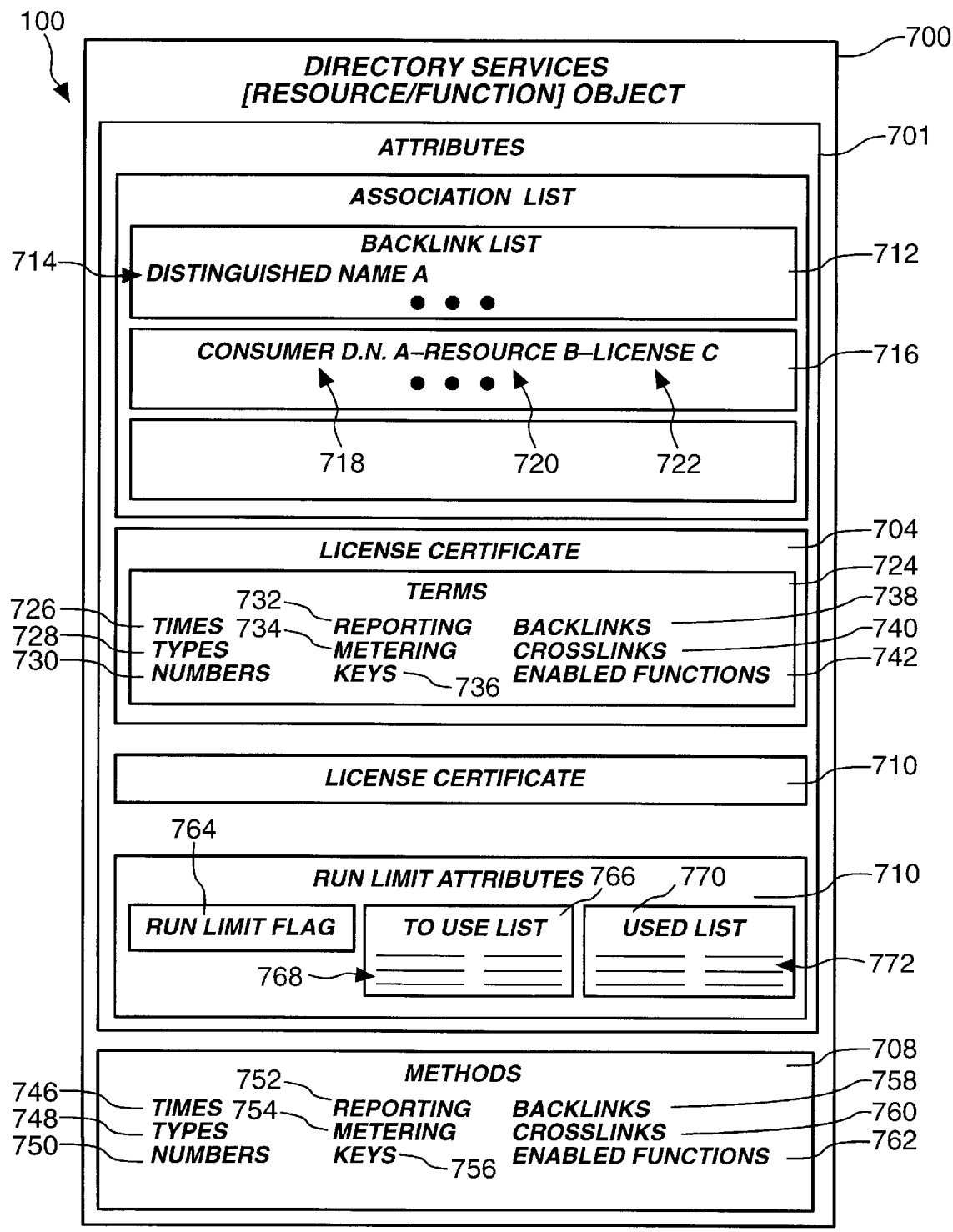
FIG. 10 is a schematic block diagram of data structures suitable for implementing a distributed licensing management system in accordance with the invention, which may use the directory services system of FIG. 3, in conjunction with the data structures and architecture of FIGS. 2-9.

Referring to FIG. 10, in view of the system of FIGS. 1–9, a directory services system 80, may include a directory services resource object 700. The directory services resource object, 700, corresponds to a generalized resource object 100, and may include any or all of the attributes 110 of FIG. 7, as well as other attributes 701. The attribute 701 may include, generally, some, all, none, or other attributes 110 than those illustrated in FIGS. 7–10.

A very significant attribute 701 in the resource object 700 is an association list 702. Multiple association lists 702 may be provided. Alternatively, a single association list 702 having different identifications for objects of varies types may also be used in one embodiment of an apparatus and method in accordance with the mentioned period. In one presently preferred embodiment, the attributes 701 may include a license 704 or license certificate 704. Multiple license certificates 706 may also be used.

Methods 708 may be included in a resource object 700, although they need not be required in order to use effectively the attributes 701. To facilitate a very simple licensing mechanism, a run limit attribute 710 may be included. The run limit attribute 710 may be adapted to maintain simple data structures for permitting or prohibiting either linking to or otherwise using a resource object 700 improperly. In a resource object 700, an association list 712 may be an individual association list 702, or a portion of another association list 702. In one presently referred embodiment, the association list 712 may function may function as a backlink 712. Thus, distinguished names 714 in the backlink list 712 may identify consumer objects 780 having an association with the resource object 700. The backlink lists 712 may be created by the association utility 224 upon the association of a consumer object 780 (e.g. 92, 94, 96, 98).

Alternatively, a linked association 716 or linked association list 716 may be used as all or part of an association list 702. The linked association list 716 may include more than a single distinguished name 714. For example, a distinguished name 718 of a consumer object 780 may be linked to a distinguished name 720 of a resource object 700, 100, or the like, while the distinguished name 722 may identify a particular license 704 or license certificate 706 from a resource object 700, 100, of interest. As a practical matter, a resource object 700 need not be the resource object 100 associated with the resource ultimately used.

For example, a printer may be a resource. A resource object 100 may correspond to the printer. Likewise, an application may be a resource. The application object 100 corresponding to the application may identify parameters required in order to launch the application. The resource object 700 may be a licensing object dedicated to the special function of licensing other resource objects 100. Thus, the resource object 700 need not be the resource specifically corresponding to a resource entity, but may be a specialized functional object 290 (see FIG. 9) dedicated to the specific function desired to be preformed with respect to consumer object 780 and another resource object 100.

As a practical matter the run limit attribute 710 may be a part of the license certificate 704 or licensing attribute 704. Alternatively, the run limit attribute 710 may replace the licensing attribute 704. In one embodiment, a simplified association list 702 may be used in conjunction with a simple flag to limit or authorize licensing to a consumer object 780 a directory services resource object 100, 700. Thus, a backlink list 712 may contain a distinguished name and other information required to point to associated directory services consumer objects 780. The distinguished names 714 may be linked or otherwise expanded in a linked association list 716 identifying not only a consumer distinguished name 718. A resource object distinguished name 720 along with, optionally, a licensed distinguished name 722 or other pointer to particular licensing attributes 704.

Note that the directory services resource object 700 need not be a resource identified with a usable resource. In one embodiment, the directory services 700 may be a licensing object having functionality limited strictly to supporting licensing between other objects 100, 780. Thus, in one embodiment, the directory services object 700 may be architected to reflect a license between two object 100, 780, between numerous objects 100, 780, or may reflect merely the licensure between a specific resource, for which the resource object 700 is the designated directory services object corresponding thereto, and another consumer object 780.

The terms 724 of the licensing attribute 704 may include any data (attributes) that may be of us. For example, times 726 may include start dates, end dates, elapsed times, time periods, time windows on particular days, such as peak times, non peak times, and the like that may be useful in determining a cost, numbers of installations, and the like, related to licensing.

A types attribute 728 may reflect permissible types of directory services objects 100 that may be linked. For example, certain type of objects 92 may not be permitted to be linked to other types. Simile, numbers attributes 730 may reflect limits on numbers of objects 92 that may be related. For example, many licenses permit installation of a specific of instances of an available, licensed resource. In one embodiment, a numbers attribute 730 may either limit or simply record the numbers of instances being used or permitted.

A reporting attribute 732 may include something as simple as a flag designating reporting to be conducted or may include selected attributes identifying key information to be reported. Since tracking of licensed installations is a matter of considerable economic and security-related importance, reporting attributes 732 may be designed to facilitate these functions.

A metering attribute 734 may be related to a numbers attribute 730. For example, over-licensing has sometimes occurred in installations where large numbers of instances of a resource have been licensed, while very few users require the resource. Alternatively, many instances (e.g. tousers) of a resource may need to be licensed, while the actual use at any time may be limited to a few users. Accordingly, a metering attribute 734 may be used to track the actual use in terms of total work station hours in which a resource has been used. Whereas the time attribute 726 may circumscribe the permissible times that a resource may be used, the metering attribute 734 may record for costing, loading, network management or other purpose the actual use of the licensed resource.

In some embodiments, security, limitations on dynamic links permissible, and the like may be implemented in the authorization keys 736, such as cryptographic keys. Likewise, licensing attributes 704 may include the passing, distribution, authorization, and the like of rights to make, distribute, or use certain keys in the operation of resource. Accordingly, key attributes 736 may be included in a license certificate 704.

Backlinks 738 may be critical for security as well as upkeep or cleanup of resources over a network 30, 50, 70. In one embodiment, backlink attributes 738 may be included in a licensing attribute 704 in order to point to objects 92, 780 or other resource objects 100, 700 outside of whatever objects 700 includes the actual licensing certificate 704. Accordingly, the backlink attribute 738 may permit rabid clean up of removed links by identifying all objects 92, 780 that are effected by or linked through the licensing attribute 704. Similarly, a cross linked attribute 740 may identify two directory services objects 92 linked by a directory services licensing object 74 dedicated strictly to a licensing function, and not actually being one of the objects 92 associated with one another respective consumer 780 and resource 100 objects 92.

A licensing attribute 704 may provide a template of authorized functions, permitted links, or licensed functionality of a resource associated with a resource object 100, 700. Thus, enabled functions attributes 742 may define a template of rights or functions of a resource object 100, 700 (actually of the resource corresponding there to) available to a consumer associated with a consumer object 780 licensed thereby.

In one embodiment, methods 708 may include executables corresponding with the attributes 726; 742 of the licensing attributes 704. Thus, times 746, types 748, numbers 750, reporting 752, metering 754, keys 756, backlinks 758, cross-links 760, enabled functions 762, some of the forgoing, all of the foregoing, or additional executables may be included in the methods 708. In one presently preferred embodiment, executables directed to maintenance of the attributes 701 are included in a licensing utilities 248 as a snap-in 222 in the network administration module 220. Meanwhile, the consuming executable for the attributes 701 may be included in the launcher executables 192, such as in a licensing API 219 or a licensing dynamic link library 214, or the like. Nevertheless, in one embodiment the licensing method 708 may be incorporated directly into a directory services resource object 700, a directory services licensing object 700, or the like.

A run limit attribute 710 may be part of the licensing attribute 704, may be the entire licensing attribute 704, or may be provided in addition there to. In one embodiment, the run limit attribute 710 may rely on a run limit flag 764. The flag 764 may simply be set to enable or disable use of a resource object 100, 700 by a consumer object 780. The run limit flag 764 may be linked to various consumer objects 780 or used to link resource objects 100, 700 to consumer objects 780, or the like. An affirmative use list 766 may include entry 768 identifying consumer objects 780 that may link to and use the resource corresponding to a resource object 100, 700. Alternatively, a negative use list 770 may include entries 772 corresponding to consumer objects 700, or the like, that are prohibited from being licensed to use a resource 100, 700.

As noted previously, a resource and the resource's corresponding resource object 100, 700 are distinct, but the object 100, 700 represents the resource. Thus, it is not improper to speak of the object 100, 700, 780 as though it were the resource or entity (user, node, group, supervisor, etc.) respectively, itself.

The negative use list 770 may be implemented rather simply. In one embodiment, each entry 772 may correspond to a consumer object 780 that has once run a resource object 700 to, for example, install software. If a single installation is permitted, the negative use list 770 may prohibit multiple installations by saving an entry 772 for each consumer object 780 that has once run the resource 100, 700. In one embodiment, an affirmative use list 776 may identify a limited number of authorized consumer objects 780, while a negative use list 770 may be used in conjunction therewith to ensure no more than one run. Thus, a consumer object 780 may be at once authorized by an affirmative use list 766 for at least on run, while being prohibited from more than one run by a negative use list 770.

Figure 11:
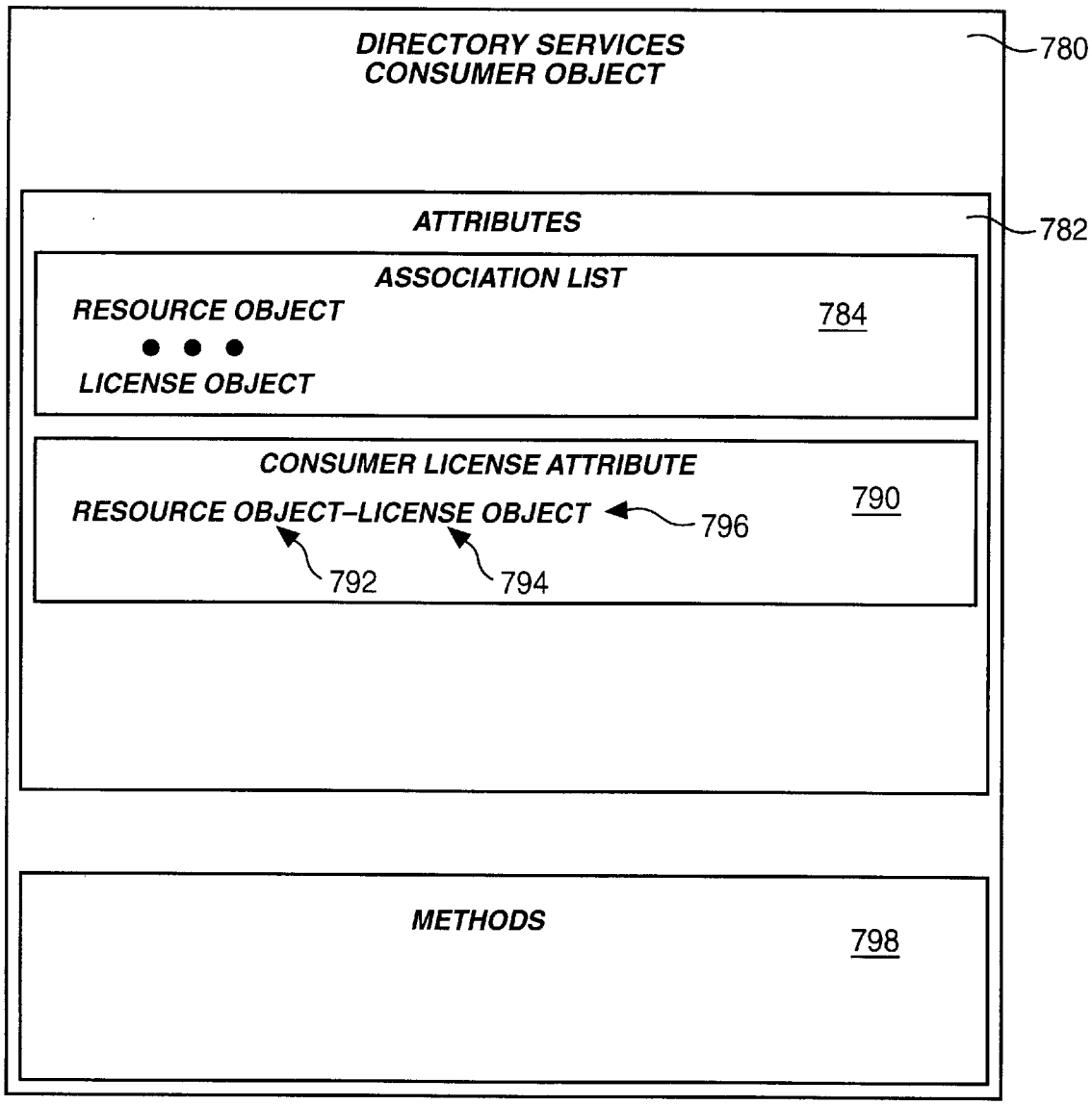
FIG. 11 is a schematic block diagram of methods for implementing one embodiment of the functions and data structures of FIG. 11 in accordance with the invention.

Referring to FIG. 11, a directory services consumer object 780 may be provided with attributes 782 corresponding to the attributes 110, in general, of an object 92, such as the objects 94, 96, 98. An association list 784 may be included in the attributes 782. For example, a resource object 786 may be identified, corresponding to a resource object, 100, 700 associated with the consumer object 780. Simile a license object 788 may identify a distinct, directory services licensing object 700, unique from a particular resource object 100, 700 represented by the entry 786, accordingly a licence 788 may be associated with a consumer object 780 in conjunction with, or independent from, a resource object 786 identified there in. One may note that the association list 784 may point to resources 100, 700 as well as other objects 92 in the directory services system 80. Meanwhile, those other objects 92, 100, 700 contain there own association lists 702 (e.g. 114, 122, 164, etc) pointing back to the respective consumer object 780.

In one embodiment a consumer object 780 may include a consumer license attribute 790. For example, a licensing object 700 may be a resource object 700 distinct from any other resource object 100 that may be used by a consumer object 780. Accordingly, a consumer license attribute 790 may associate a licensing object 700 having licensing attributes 704 with the consumer object 780. In one embodiment, a resource object distinguished name 792 may be linked to a license object distinguished name 794 in a single entry 796, accordingly, a consumer object 780 may carry a consumer license attribute 790 linking the consumer object 780 to a resource object 100 and a licensing object 700 associated therewith. Thus, licensing may be generalized across many consumer objects 780, uniquely identified with a single consumer object 780 and the link thereof with a single resource object 100, or may be identified with a resource object 100 regardless of the consumer object 780 with which that resource object 100 may be linked. Thus, in one presently preferred embodiment, great flexibility in licensing may be permitted by use of the licensing attribute 704, alternatively referred to as a resource licensing attribute 704 included as a attribute 701 of a directory services resource object 700, a consumer licensing attribute 790 included as part of a directory services consumer object 780, or a directory services licensing object 700 dedicated to licensure as a sole functionality. Again, method 798 may be included in a consumer object 780 for performing managmentive attributes 782, execution of licensing, or the like. Nevertheless, in one presently preferred embodiment, a consumer object 780 may include no method 798, the methods being provided by executables external to the consumer object 780.

Note that many attributes 110 for licensing and lining may be stored in either the resource object 700 or the consumer object 780. For example the linked association list 716, in one embodiment is in the consumer object 780. Thus, only the name 714 of a consumer object 780 need be provided in the backlink list 712. Once pointed to by the resource object 700, the consumer object 780 may provide the attribute 716 linking the resource object 700 to the license.

Figure 12:
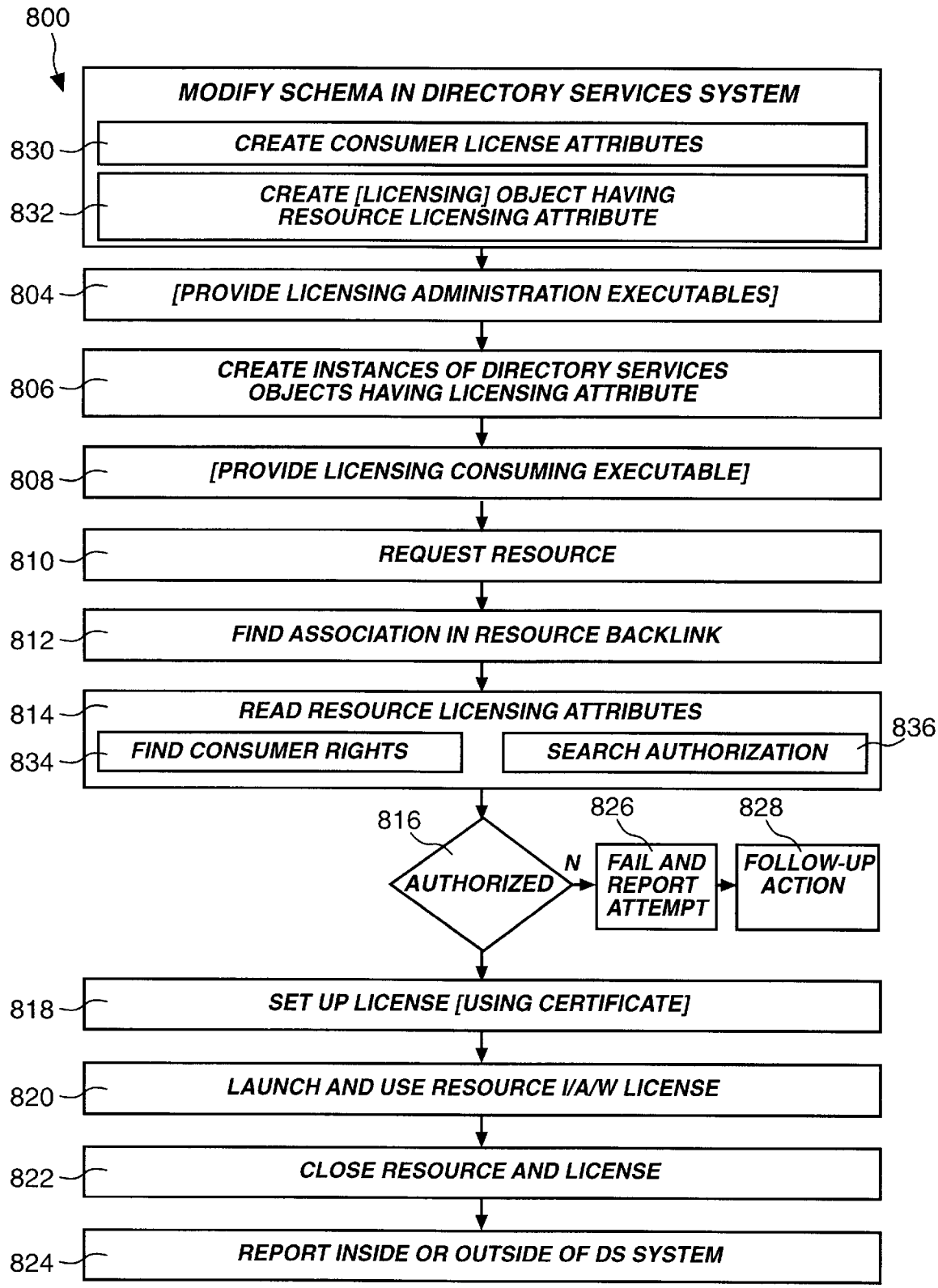
FIG. 12 is a schematic block diagram of a licensing method in accordance with the invention.

Referring to FIG. 12, a method 800 is illustrated for implementing certain presently preferred embodiments of an apparatus and method in accordance with the mentioned. A modify schema attribute 802 may provide modification of the schema of a directory services system 80 to incorporate licensure in the attributes 110, methods 108, administration module 220, libraries 196, all of the above, or selected ones of the above. In one embodiment, the modified step 802 may provide for an old or new directory services object 92 having the proper attributes 110 for supporting licensing. A provide step 804 may, optionally, provide an administration executable, such as a licensing utility 248. A create step 806 may spawn or create instances of objects 92 in accordance with the modify step 802 extending the schema.

Also optionally, a provide step 806 may provide an executable for consuming an attribute 110 in accordance with the newly created licensing functionality. A request step 810, during an initiate linking or association along with licensure, after which a find step 812 may backtrack to check the authorization of the requesting consumer 780. A read step 814 may obtain a licensing information for testing 816.

An affirmative response to the testing step 816 may initiate a setup step 818. Thereafter, a launch step 820 or use step 820 may use the resource 100, 700. Upon closure 822, or a close step 822, a report step 824 may feed back selected licensing information to records in the directory services system or elsewhere.

The modify step 802 may include a create step 830 for creating consumer license attributes 790. To create step 830, in view of the optional architectures available for the directory services objects 700, 780, may be dispensed with, except that a consumer object 780 will require sufficient attributes 782 to support licensing. The create step 832 creates an object 92, in a directory services system 80, which object 92 has a resource licensing attribute 704. As a practical matter, the create step 832 may create a directory services resource object 100, 700 having a licensing attribute, a directory services licensing object 700 devoted strictly to licensing, and for storing the licensing attribute 704, or a consumer 780 having a consumer licensing attribute 790. Alternatively, one, or all such objects 92 may be created.

In one presently preferred embodiment, the create step 832 may create a resource object 700 endowed with a resource licensing attribute 704. The resource object 700 may thus be self-licensing.

The provided step 804 may provide any suitable executable for maintaining the licensed attribute 704 in a directory services resource object 700. Alternatively, in keeping with other architectural options, the administration executable may also maintain the consumer license attribute 790. In one embodiment, the association utility 224 may incorporate the licensing executables for maintaining necessary attributes 704. In one presently preferred embodiment, a dedicated licensing utility 248 may be provided as a snap-in 222 in the network administration module 220 to maintain the licensing attribute 704 of a resource object 700.

The create instances step 806 may spawn instances of the directory services object 700 determined by the modify step 802 to contain the licensing attribute 704. Meanwhile the steps 804, 808 may occur before or after one another, and before or after the create step 806. As a practical matter, however, the provide step 808, in one presently preferred embodiment results in a licensing API 219 or simply a network loadable module (e.g. such as a Novell NetWare loadable module), embedded within a launcher 190. In another presently preferred embodiment, a licensing API 219 is included in a dynamic link library 196 and performs all consumption (use) of the licensing attributes 704. Remember that the run limit attribute 110 may be one embodiment of a licensing attribute 704, the totality thereof, or a part thereof.

A request step 810 may typically come from a launcher 190, or be made to a launcher, in the form of a request by a consumer object 780 for access to a directory services resource object 100, 700. As described in association with FIG. 9, the request step 810 may be implemented in a variety of ways. The find step 812 may involve locating the distinguished name 714 of a consumer object 780 requesting access thereto, in the association list 701 of the resource object 700 requested or required. In one embodiment, an association utility 224 may actually make the association required by the find step 812 at run time. In another presently preferred embodiment, such association may be done well in advance of actual use of a resource object 700, and may simply be checked by the find step 812 to verify the association and authorization.

The read step 814 may find 834 an entry 796 in a consumer licensing attribute 790 in a consumer object 780. The read step 814 may search 836 and attribute 716 identifying authorization of licensing. In one embodiment, either of the steps 834, 836 may be optional. For example, the find step 834 may identify a distinguished name of a consumer object 780 in the affirmative use list 768, while the search 836 may determine whether or not the negative use list 770 will preclude use of the resource 700 by the consumer object 780. By whatever mode, the read step 814 may determine the licensing attributes 704 to be used, and whether authorized.

The test 816 determines authorization, in negative response may result in a fail step 826. The fail step may include a report back to the network administration module 220 of the attempt. Thus, a pattern of unauthorized or improper attempts by a consumer object 780 may be tracked. Likewise, a follow-up step 828 may be triggered by the report 826. Thus, a high degree of sophistication in licensing, reporting, and policing of licenses may be implemented in the method 800.

The set up step 818 may use the licensing attribute 704 (e.g. license certificate 704) to set up the authorizations for a license by the consumer object 780 to use the resource object 700. In one presently preferred embodiment the set up step 818 may be executed by the launcher 190, using the licensing API 219, NLM, methods 708, 798, or the like.

The launch step 820 may complete the activities of the launcher 190 in running the resource corresponding to the resource object 700 on behalf of, or under the direction of the consumer object 780. The licensing attributes 704 being fully implemented in such use, the close step 822 may remove all links that exist dynamically during the time of running a resource 700 for a consumer object 780. In one embodiment, the close step 822 may be activated by virtue of the licensing attribute 704, in the event of an illegal operation attempted by a consumer object 780. In another embodiment, the launch and use step 820 may simply maintain all executions within the bounds of the licensing attributes 704, and close 822 the access at the appropriate time.

As a practical matter, the report step 824 may also be embodied in the launch and use step 820. The report step 824 may be executed by the licensing API 219 and reported back to the licensing utility 248 in the administration module 220. If the report step 824 reports data to be stored in the directory services system 80, the burden on the directory service supporting executables 104 may be increased. Thus, in one embodiment, the report step 824 may provide data to a file to be accessed and used by the network administration module 220, such as the licensing utility 248. Thus, the directory services system 80 need not maintain all licensing history deemed to be worth saving or acting upon. Alternatively, security concerns may militate in favor of the directory services system 80 maintaining all control of licensing. Thus, the licensing utility 248 may immediately store out to the resource object 700, or other data structure, ongoing reporting of licensing activities.

Figure 13:
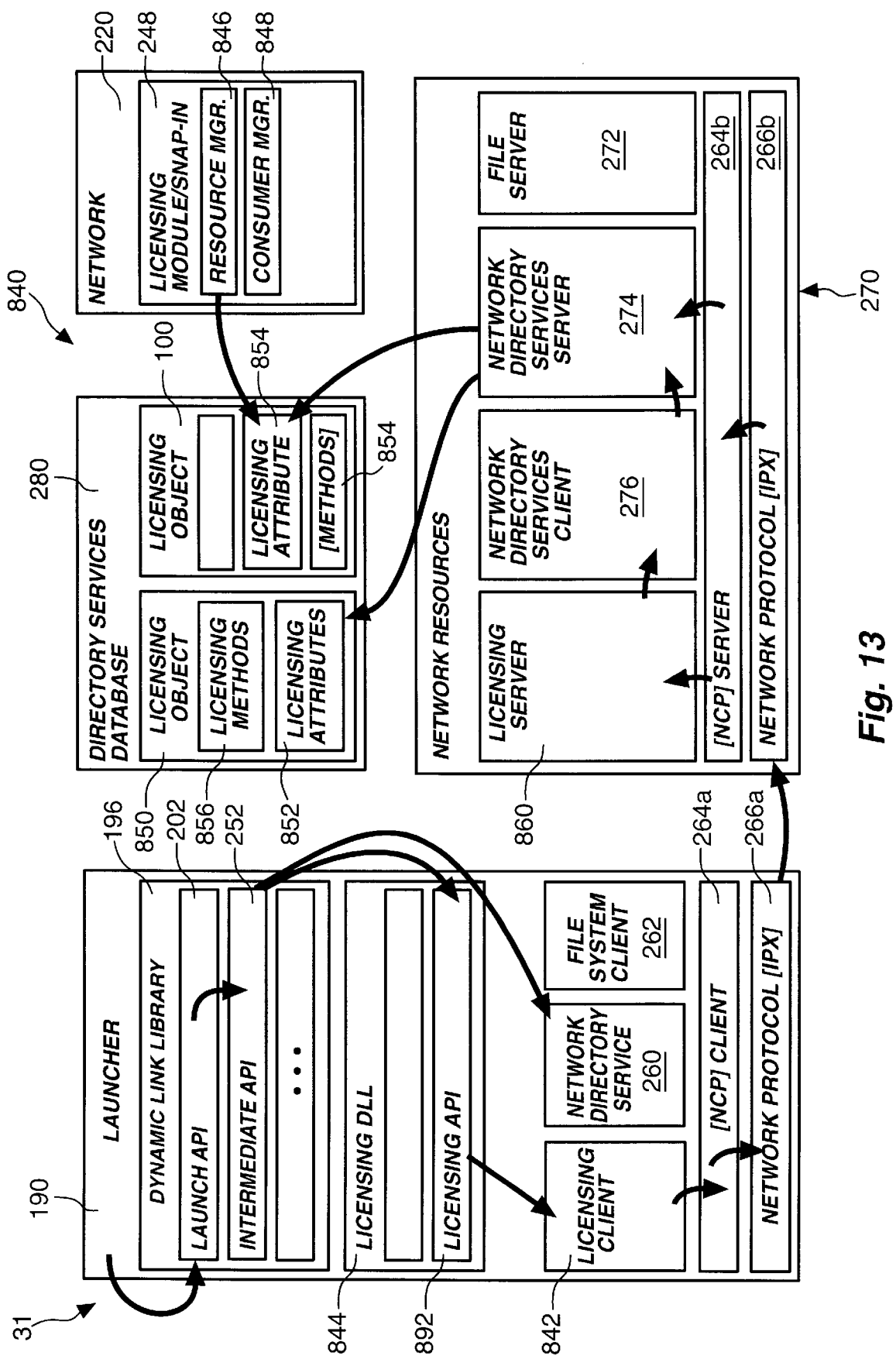
FIG. 13 is a schematic block diagram of the data structures for implementing the method of FIG. 12.

Referring to FIG. 13, in view of the hardware of FIGS. 1–2, data structures of FIGS. 3–11, and the method of FIG. 12, a licensing system 840 is illustrated. A note 31 may host a client 842 of the licensing system 840. For example, the launcher 190 as discussed with respect to FIG. 9, may include a network loadable module (e.g. NLM) to perform licensing, or may rely on a licensing API842 as a client portion of a licensing system 840. The licensing API842 may be included in a specialized licensing dynamic link library 844, or may simply be part of an overall, generic, general purpose dynamic link library 196. The network administration module 220 may be implemented to include a licensing module 248 as a snap-in 222. The licensing module 248 may include a resource manager 846 for maintaining the license attribute 704 of a resource object 700. Likewise, a consumer manager 848 may maintain the attributes 790 or even association list 784 used in licensing, for the consumer object 780. Again, an executable 846, 848 may be embodied in any suitable configuration between a single instruction to a processor 32 up to a complex system of applications.

A resource object 100, a licensing object 850, or both may be provided in the directory services data base 280. The licensing object 850 may include licensing attributes 852 effective for providing licensing of one or more resource objects 100. The resource object 100 may include licensing attributes 854, itself. In one embodiment, the licensing object 850 may include licensing methods 856 for using the licensing attributes 854 of a resource object 100 to effect licensure. Alternatively, the licensing object 850 may include methods 856 relying on licensing attributes 852 within the licensing object 850, itself. The methods 858 may optionally use the licensing attribute 854 of the resource object 100 to license the resource object 100 alone. In one presently preferred embodiment, neither the licensing object 815 nor the resource object 100 include methods 856, 858 respectively. Instead, the licensing API219 consumes the licensing attributes 854 while the licensing utility 248 maintains the attributes 854. In another presently preferred embodiment, the same licensing utility 248 and licensing API1219 operate, each on the licensing attributes 852 of a licensing attribute 850. In such an embodiment, licensing attributes 854 may be as simple as the backlink list 712 to consumer objects 780 having licensed access to the resource object 100.

Further to the discussion with respect to FIG. 9, the licensing API 842 may be embodied as a licensing client 842 operating through the client software 264a, such as the NetWare core protocol client 264a, through the network protocol 266a, such as the internetwork packet exchange protocol 266a, 266b. The licensing client 842 may access the a licensing attributes 852, 854 by accessing a licensing server 860, which licensing server 860 acts through a network directory services client 276 to communicate with a network directory services server 274. Alternatively, an NLM, licensing API842, or the like, may act directly through a network directory services client 260 (and appropriate client/server layers 264, with associated protocols 266) to access the network directory services server 274. Thus, by the former method, the licensing client 842 may access a licensing object 850 in order to use the licensing attributes 852. In the later approach, the licensing API842 or other intermediate API852, accessed in the library 196 by the launcher 190 may simply act through a directory services client 260 to a directory services server 274 in order to read directly the licensing attributes 854 in the resource object 100 (e.g. resource object 700). Thus, the directory services object 700 on FIG. 10 may be embodied as the licensing object 850, the resource object 100, or each 850, 100 may be embodies to include one or more of the attributes 701 of the directory services object 700 of FIG. 10 in order to implement the features of FIG. 13.

As a practical manner, the licensing module 248, in managing the licensing attributes 852, 854 of the objects 850, 100 respectively, is illustrated in FIG. 13 with a broken arrow. The break indicates that the licensing module 248 operates similarly to the launcher 190 in gaining access to the objects 850, 100. Thus, the different methods of accessing through a client 842 dedicated to a special purpose, or through a directory services generic client 260 to access either the object 850 with his attributes 852, or simply the attributes 854 of an object 100 may be used by the network administration module 220. Thus, the resource manager 846, consumer manager 848, both, or the like may access the attributes 852, 854 as described in the data structures and methods of FIG. 9.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for managing licensing of a resource over a network, using a directory services system, the apparatus comprising:
   a network comprising interconnected computers;
   a processor in the network for executing executable data structures;
   a memory device operably connected to the processor for storing the executable data structures and operational data structures associated therewith, the executable and operational data structures comprising:
   a directory services system for storing and managing attributes of directory services objects and relationships between the directory services objects;
   a resource object, of the directory services objects, corresponding to a resource selectively available to be licensed over the network;
   a licensing attribute stored in the directory services system and effective to license use of the resource.
   a consumer object, of the directory services objects, corresponding to an entity for using the resource in accordance with the selected licensing attribute.

2. The apparatus of claim 1, wherein the licensing attribute is stored in the resource object.

3. The apparatus of claim 2, further comprising an administrative module, executable to manage the value of the licensing attribute.

4. The apparatus of claim 3, further comprising a consuming executable for using the licensing attribute to effect a licensing of the resource to be used by the entity corresponding to the consumer object.

5. The apparatus of claim 1, wherein the licensing attribute is stored in the consumer object.

6. The apparatus of claim 1, wherein the licensing attribute further comprises a plurality of attributes, including a resource licensing attribute stored in the resource object, a consumer licensing attribute stored in the consumer object.

7. The apparatus of claim 6, wherein the executable data structures further comprise an administrative executable for managing the value of the licensing attribute.

8. The apparatus of claim 7, wherein the executable data structures further comprise a consuming executable effective to use the licensing attribute to effect licensing of the resource object for access by the consumer object.

9. The apparatus of claim 8, wherein the consuming executable is contained in a dynamic link library.

10. The apparatus of claim 9, wherein the consuming executable is an application programming interface associated with a launcher for launching the resource.

11. The apparatus of claim 10, wherein the administrative executable further comprise a licensing utility for managing the values of the licensing attribute.

12. The apparatus of claim 11, wherein the licensing utility is a snap-in module.

13. The apparatus of claim 1, wherein the operational data structures further comprise an association list for linking the consumer object to the resource object in accordance with the licensing attribute, and wherein the executable data structures further comprise licensing executables for controlling and reporting use of the resource by the consuming entity.

14. The apparatus of claim 1, wherein the resource is an application.

15. The apparatus of claim 1, wherein the licensing attribute is independent from the resource.

16. The apparatus of claim 15, wherein the licensing attribute is stored in the resource object.

17. A method for managing licensing of a resource over a network, the method comprising:
   providing a directory services system for managing and relating objects having directory services attributes;
   providing a resource object, of the directory services objects, corresponding to a resource;
   providing a consumer object, of the directory services objects, corresponding to a consuming entity for using the resource;
   providing a licensing attribute in the directory services attributes; and
   providing licensing executables for using the licensing attribute to control licensing of the resource by the consuming entity.

18. The method of claim 17, further comprising:
   creating an instance of the resource object;

associating the instance with the consumer object; and licensing the resource object to use the consumer object for providing access by the consuming entity to the resource.

19. The method of claim 17, wherein providing the licensing executables further comprises:

providing an administration executable for managing a value of the licensing object; and providing a consuming executable for reading the value and licensing the resource to be used by the consuming entity in accordance therewith.

20. The method of claim 17 further comprising:

providing a launcher for launching the resource;

requesting of the launcher to launch the resource in association with the consumer object;

licensing to the consumer object, by the launcher, access to the resource, using the licensing attribute contained in a directory services object.

* * * * *